(12) United States Patent
Jupudi et al.

(10) Patent No.: US 9,743,418 B1
(45) Date of Patent: Aug. 22, 2017

(54) AUTOMATIC CHANNEL SELECTION IN WIRELESS LOCAL AREA NETWORK (WLAN) CONTROLLER BASED DEPLOYMENTS USING COLOR GRAPHS

(71) Applicant: Fortinet, Inc., Sunnyvale, CA (US)

(72) Inventors: Siva Yogendra Jupudi, Karnataka (IN); Rajkumar Shanmugham, Karnataka (IN)

(73) Assignee: Fortinet, Inc., Sunnyvale, CA (US)

(*) Notice: Subject to any disclaimer, the term of this patent is extended or adjusted under 35 U.S.C. 154(b) by 0 days.

(21) Appl. No.: 15/199,858

(22) Filed: Jun. 30, 2016

(51) Int. Cl.
| | | |
|---|---|---|
| *H04W 72/00* | (2009.01) | |
| *H04W 72/08* | (2009.01) | |
| *H04B 17/318* | (2015.01) | |
| *H04W 48/16* | (2009.01) | |
| *H04W 84/12* | (2009.01) | |

(52) U.S. Cl.
CPC ........ *H04W 72/082* (2013.01); *H04B 17/318* (2015.01); *H04W 48/16* (2013.01); *H04W 84/12* (2013.01)

(58) Field of Classification Search
CPC . H04W 28/0236; H04W 36/20; H04W 40/16; H04W 48/16; H04W 72/082; H04W 84/12; H04B 17/318

USPC .............. 455/450, 451, 452.1–452.2, 434
See application file for complete search history.

(56) References Cited

U.S. PATENT DOCUMENTS

| | | | |
|---|---|---|---|
| 2015/0079974 A1* | 3/2015 | Farhadi ............... | H04W 16/14 455/426.1 |
| 2015/0223249 A1* | 8/2015 | Ganu ................... | H04W 16/10 370/329 |

* cited by examiner

*Primary Examiner* — Wayne Cai
(74) *Attorney, Agent, or Firm* — Law Office of Dorian Cartwright (57) ABSTRACT

Wi-Fi channels are automatically selected in a WLAN controller based deployment. Scan results received from each of the plurality of access points comprise a list of neighboring access points from the plurality of access points relative to each access point. Responsive to a number of the plurality of access points exceeding a number of non-interfering channels, assigning each of the plurality of access points to a non-interfering channel with sharing of at least one of the non-interfering channels, using a GCA (Graph Coloring Algorithm) in which each color assignment corresponds to a non-interfering channel assignment in order to prevent neighboring access points from sharing a non-interfering channel. Lowest RSSI measurements collected by access points can also be a factor in channel selection.

6 Claims, 7 Drawing Sheets

| | AP1 | AP2 | AP3 | AP4 | AP5 | AP6 |
|---|---|---|---|---|---|---|
| AP1 | 0 | 1 | 1 | 0 | 0 | 0 |
| AP2 | 1 | 0 | 0 | 1 | 0 | 0 |
| AP3 | 1 | 0 | 0 | 0 | 1 | 1 |
| AP4 | 0 | 1 | 0 | 0 | 1 | 0 |
| AP5 | 0 | 0 | 1 | 0 | 0 | 1 |
| AP6 | 0 | 0 | 1 | 0 | 1 | 0 |

AUTOMATIC CHANNEL SELECTION IN WIRELESS LOCAL AREA NETWORK (WLAN) CONTROLLER BASED DEPLOYMENTS USING COLOR GRAPHS

FIELD OF THE INVENTION

The invention relates generally to computer networking, and more specifically, to automatic channel selection in WLANS for reducing channel interference.

BACKGROUND

IEEE 802.11 enabled Wi-Fi devices provide wireless communication across devices using the limitedly available natural resource radio frequency. With increased integration of wireless to several devices the spectrum and interference has become major problems for the efficiency of the wireless network (WLAN).

In large scale enterprise WLAN deployments there exists a centralized controller managing the wireless access points (APs). To ensure effective radio coverage in these deployments, there is a need to place the APs with overlapping radio coverage area. It brings in a problem to address spectral efficiency due to co channel and adjacent channel interference.

In addition, the spectral characteristics change due to dynamic character of radio environment, and so it is essential to continuously monitor the channel conditions and take necessary steps to maintain high bandwidth availability for higher layer applications. In a typical controller based wireless network, monitoring the channel condition and performing necessary step to maintain the throughput is relatively easy compared to a network with standalone APs. All APs, that are under one controller, periodically send information about retransmission attempts, transient link-layer failures neighbor count etc. and controller can analyze the channel condition based on these inputs and switch to a better channel.

What is needed is a robust technique for automatically selecting channels in a Wi-Fi network using color graphs for reducing interference.

SUMMARY

The above-mentioned shortcomings are addressed by an automatic channel selection in a WLAN controller based deployment using color graphs.

In one embodiment, scan results received from each of the plurality of access points comprise a list of neighboring access points from the plurality of access points relative to each access point. Responsive to a number of the plurality of access points exceeding a number of non-interfering channels, assigning each of the plurality of access points to a non-interfering channel with sharing of at least one of the non-interfering channels, using a GCA (Graph Coloring Algorithm) in which each color assignment corresponds to a non-interfering channel assignment in order to prevent neighboring access points from sharing a non-interfering channel. The channel assignments are sent to the plurality access points.

In another embodiment, RSSI measurements collected by access points can also be a factor in channel selection. In one case, when there are too many access points for neighboring access points to have an exclusive channel using GCA, shared channels are determined by the lowest RSSI of a pair.

Advantageously, access point performance is improved, as well as perceived network performance for connected stations.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Hand-off control systems, computer-implemented methods, and (non-transitory) computer-readable mediums for navigation security onboard a UAV to determine the validity of combinations of location signals.

Figure 1:
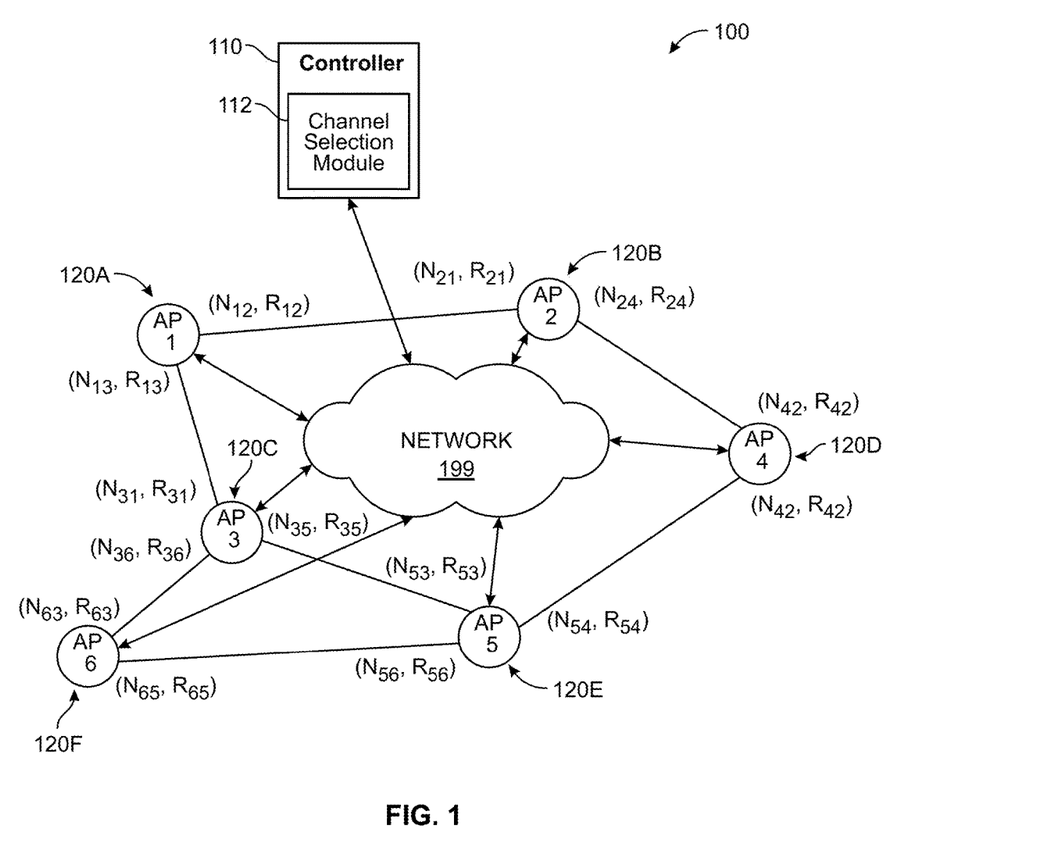
FIG. 1 is a high-level block diagram illustrating a system for automatic channel selection, according to an embodiment.
Figure 2:
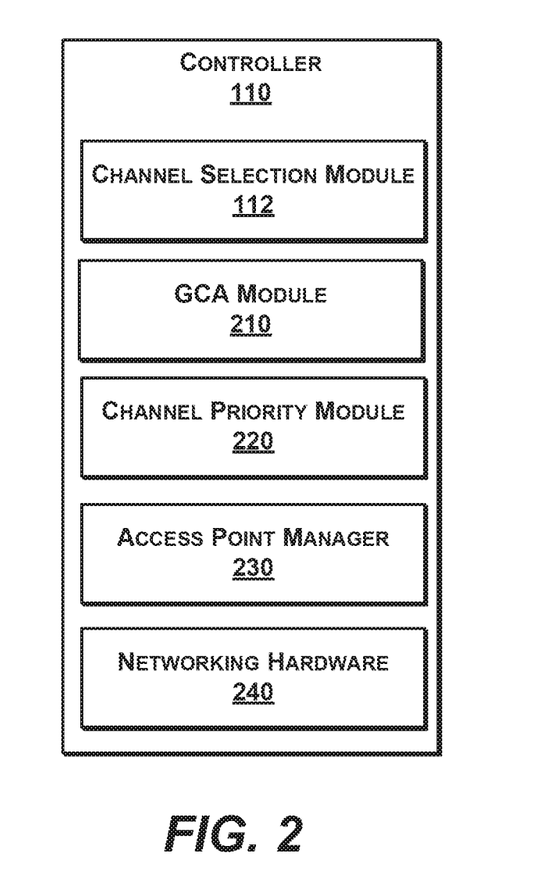
FIG. 2 is a more detailed block diagram illustrating a controller of the system of FIG. 1, according to an embodiment.

Systems for Channel Selection (FIGS. 1-2)

FIG. 1 is a high-level block diagram illustrating a system 100 for automatic channel selection, according to an embodiment. The system 100 comprises a controller 110 and access points 120A-F coupled thorough a network 199. Additional components can also be part of the system 100, such as additional controllers, access points, wireless stations, firewalls, routers, switches, and other components. The system 100 components can be implemented as hardware, software, or a combination of both.

The controller 110 manages the access points 120A-F and comprises a channel selection module 112 that, in an embodiment, automatically assigns non-interfering channels for the access points 120A-F over Wi-Fi using GCA. Channel assignments can be exclusive when a number of access points does not exceed a number of non-interfering channels. However, in high density deployments in which the number of access points exceeding the number of non-interfering channels, thereby preventing exclusive usage, GCA ensures that neighboring access points do not share a non-interfering channel, in some embodiments. In a further embodiment, when the number of access points exceeds even the limits of GCA, channel performance as perceived by a local access point can help determine which of neighboring access points should share a non-interfering channel. Many other variations are possible. An example detailed embodiment of the controller 110 are set forth in more detail below in FIG. 2.

The access points 120A-F monitor channels to collect data used by the controller 110 in channel selections. In more detail, each or some of the non-interfering channels are scanned for determining neighboring access points. For example, by listening to a channel, an access point can extract identifiers from packets sent across the channel between other access points and stations or other network devices.

Moreover, the access points 120A-F can collect channel performance metrics, reflective of actual channel usage. RSSI measurements can indicate distances between access points, and thus, likelihood for interference. Sources of interference other than access points, such as microwaves, can also be identified and characterized. Responsive to this information, either the controller 110 or the access point 120A-F can change a priority of the channel. In one case, the priority is lowered relative to a specific access point to prevent or reduce the likelihood of having the channel assigned to the specific access point.

Figure 6:
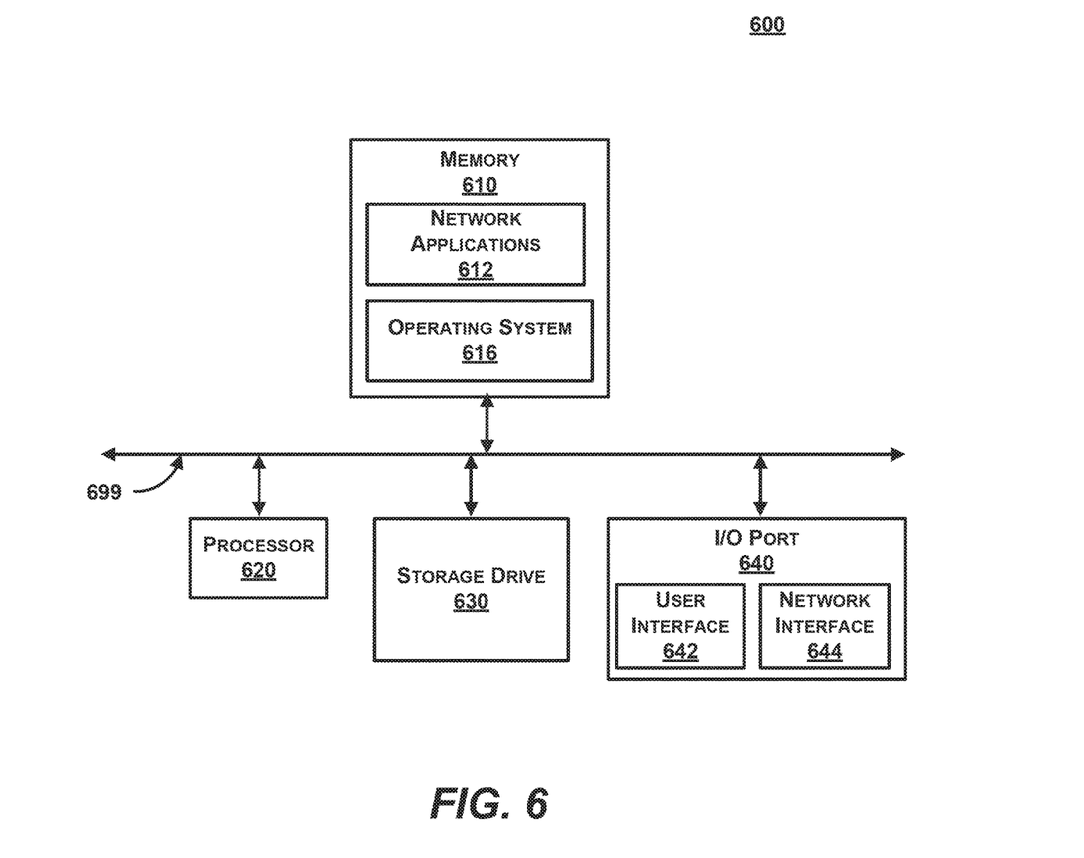
FIG. 6 is a block diagram illustrating an exemplary computing device, according to one embodiment.

The controller 110 and the access points 120A-F can be, for example a personal computer, a server blade, a mobile computer, or any appropriate computing environment (e.g., see FIG. 6).

The network 199 can be a local area network, a wide area network, the Internet, a hybrid network or the like. The network 199 includes a Wi-Fi portion operating under IEEE 802.11 or other standards.

FIG. 2 is a more detailed block diagram illustrating the controller 110, according to an embodiment. The controller 110 comprises a channel selection module 112, a GCA module 210, a channel priority module 220, an access point manager 230, and networking hardware 240. Each of the components are implementable in hardware and/or software.

The channel selection module 112 manages selection algorithms. A user interface or other input can allow network administrators control over which factors are considered and relative weights of factors for channel selection. Based on channel scans by the access points 120A-F, the channel selection module 112 can directly assign exclusive channels, activate the GCA module 210 to distribute non-exclusive channels away from neighboring access points, or activate the channel priority module 230 to consider actual channel metrics in channel selection.

The GCA module 210 applies GCA by assigning colors as channels. In other words, GCA conventionally involves a color selection for each vertex to prevent two neighboring vertices from having the same color. In the context of channel selection, each color represents a non-interfering channel and to neighboring access points are prevented from using the same channel, to the extent possible. Different types of GCA algorithms can be employed, such as Greedy Algorithm, or a minimum colors algorithm. In one embodiment, a first channel is associated with as many non-neighboring access points as possible. A second channel is associated with as many remaining non-neighboring access points, and so on, until all access points are assigned a channel or until exhaustion of channels. A neighbor matrix represents adjacent access points with a 1 (see FIG. 4B) and can be referred to when iterating through potential channel selections.

The channel priority module 220 receives channel metrics into account as factors for channel selection. Preferably, RSSI values between access points are determined during channel scans and are sent with the neighbor lists or as needed. Outside sources of interference and transmission parameters such as throughput or bandwidth can all be taken into consideration and given variable weightings. Channel switches can be according to IEEE 802.11h which includes a channel switch announcement element, or be according to other protocols.

The access point manager 230 configures local access points taking network-wide conditions into account. In the channel selection context, the access point manager 230 instructs access points on which channel to use in view of other network components and information not available to local access points. In other management tasks, the access point manager 230 handles station hand-offs between access points by associating and disassociating BSSIDs from a higher level of the network hierarchy. Stations can also be managed across the network rather than disparately at local access points.

The networking hardware 240 can comprise networking interface components such as Wi-Fi radios, Wi-Fi antennae, transceivers, coders and decoders, digital signal processors, and other supporting lower level hardware and processes necessary for communication across channels. The networking hardware 240 can support different variations of IEEE 802.11, including multiple input/multiple output (MIMO) and other techniques.

Figure 3:
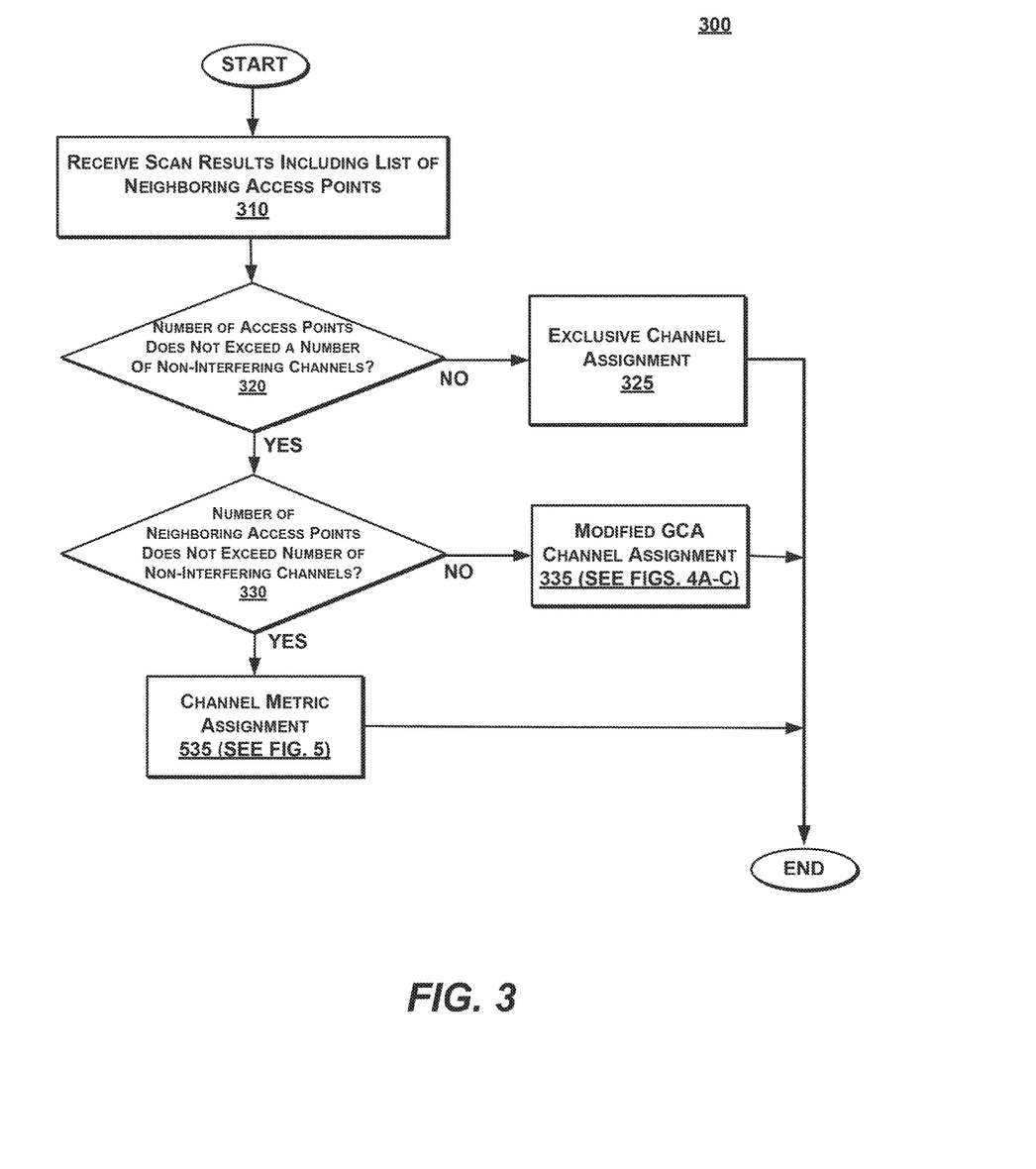
FIG. 3 is a high-level flow chart illustrating a method for determining automatic channel selection, according to an embodiment.
Figure 4A:
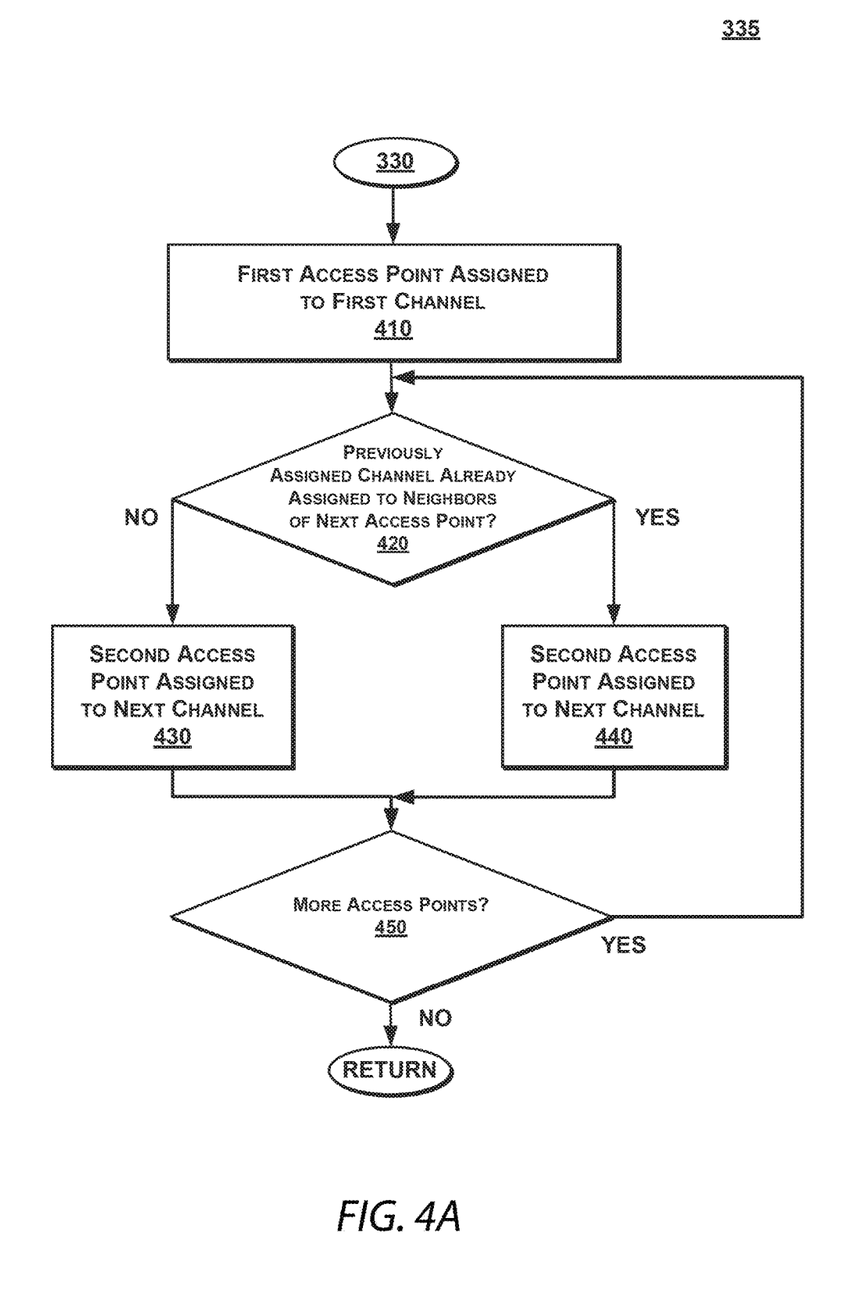
FIG. 4A is a more detailed flow chart illustrating a step of assigning channels exclusively among neighboring access points using GCA when a number of access points exceeds a number of channels of the method of FIG. 3, according to an embodiment.
Figure 4B:
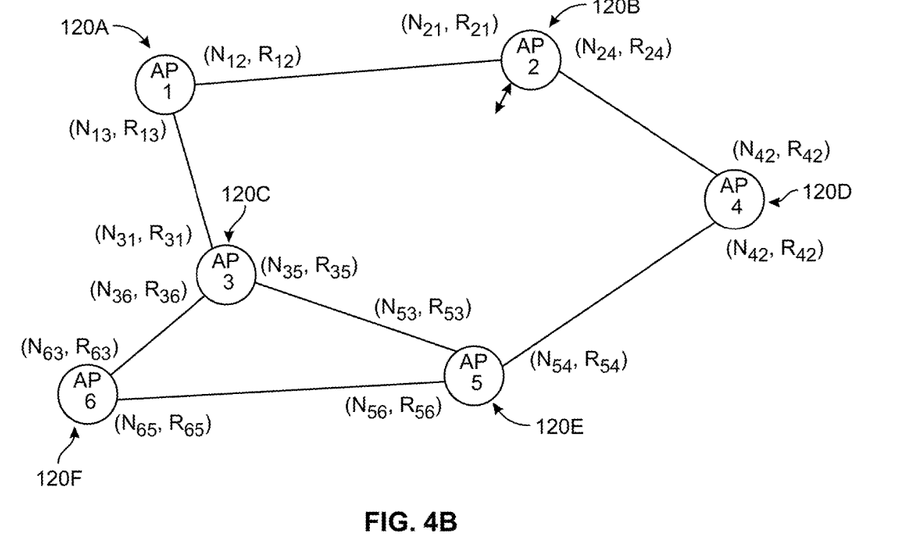
FIG. 4B is a block diagram illustrating vertices and edges of GCA as applied to neighboring access points, according to an embodiment.
Figure 4C:
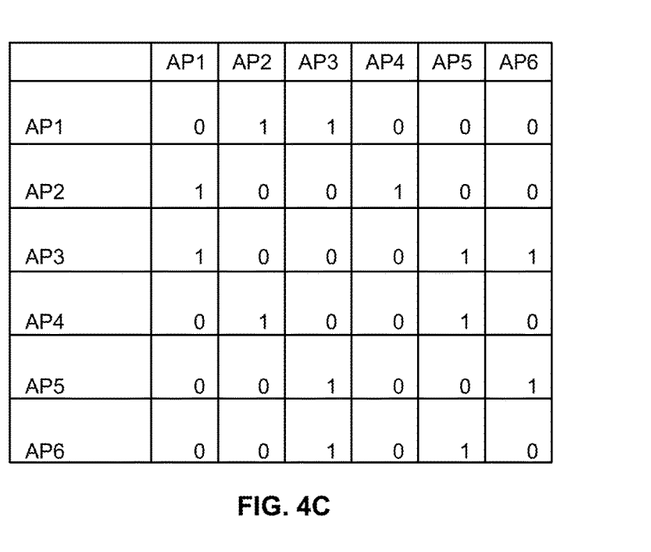
FIG. 4C is a table illustrating a neighbor matrix derived from the vertices and edges of FIG. 4, according to an embodiment.
Figure 5:
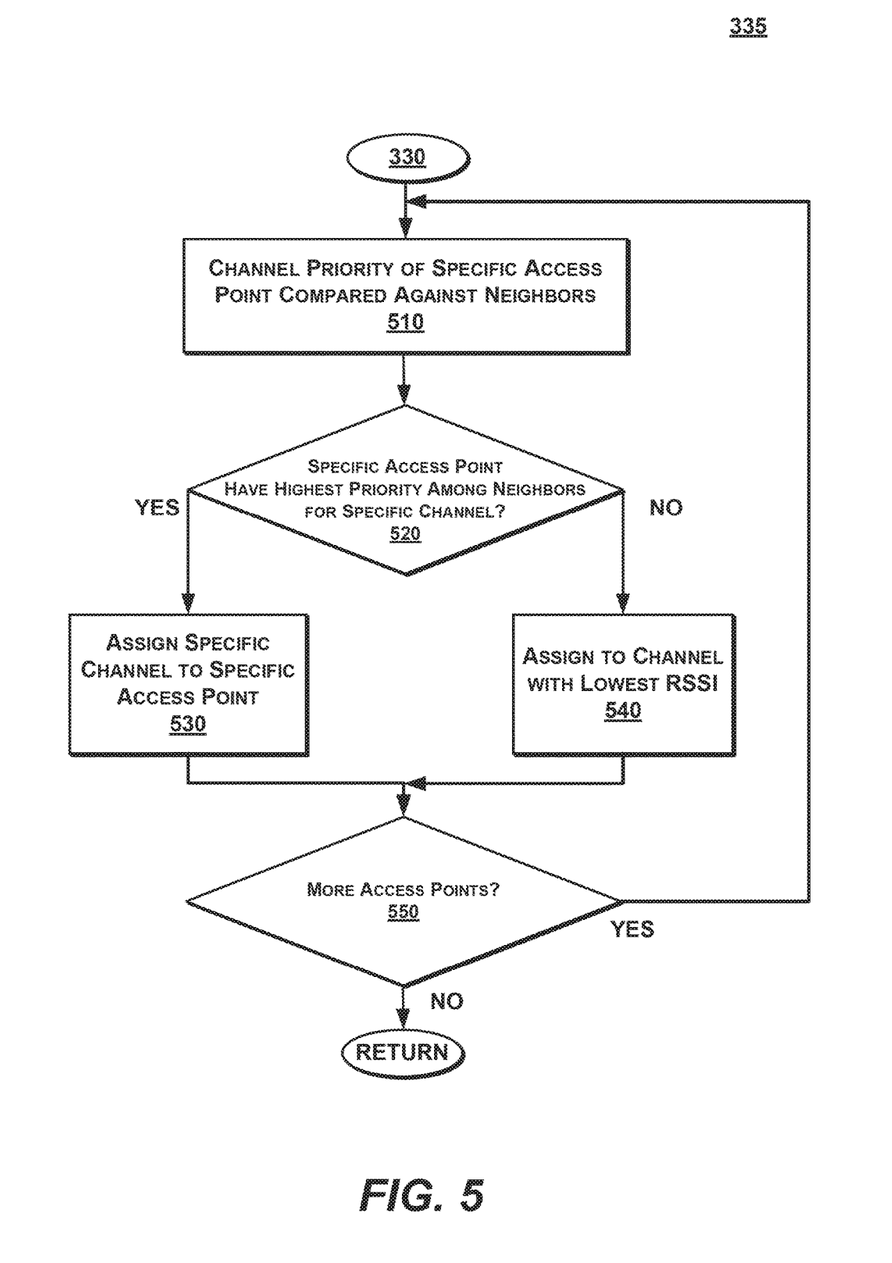
FIG. 5 is a more detailed flow chart illustrating a step of assigning channels non-exclusively among neighboring access points using channel monitoring of the method of FIG. 3, according to an embodiment.

Methods for Channel Selection (FIGS. 3-5)

FIG. 3 is a high-level flow chart illustrating a method 300 for determining automatic channel selection, according to an embodiment. One of ordinary skill in the art will recognize that the method 300 is non-limiting as other embodiments can have more or less steps and can be performed in a different order. The method 300 can be implemented in the system 100 of FIG. 1 or in other components.

Scan results including list of neighboring access points is received from access points (step 310). To do so, each access point can listen to each available non-interfering channel. Channels can be from a 2.4 GHz bandwidth, a 5.0 GHz bandwidth, and the like. Other access points are identified and added to a list. Test can be performed by sending pings, beacons, and the like to check RSSI, flight time, and the like.

If a number of access points does not exceed a number of non-interfering channels (step 320), channels can be exclusively assigned (step 325). Otherwise, it is determined whether a number of neighboring access points for a specific access point exceeds a number of non-interfering channels (step 330).

If a number of neighboring access points does not exceed the number of non-interfering channels step (330), channels are assigned by GCA techniques (step 335), as shown in FIG. 4 A first access point is assigned a first channel (step 410). If available (step 420) next access point is assigned to a channel that is not assigned to any of the neighboring access points, but has been previously assigned (step 430). Neighboring access points are determined from lists submitted by each access point as shown in FIG. 4B. The lists can be aggregated into a table as shown in FIG. 4C for reference during channel assignments. If no previously assigned channels remain (step 420), assign the next access point to a new channel (step 440). Continue (step 450) until all access points haven assigned. Additional optimization techniques can be applied to further reduce a number of channels. Some implementations also use channel priority or channel metrics to choose which of available channels can be assigned when more than one qualifies. Other implementations assign randomly or by next in line.

But if there still are not enough channels, sharing channel assignments are influenced by actual channel metrics (step 350). One implementation picks a specific access point. For each channel, a channel priority of the specific access point is compared against neighbors (step 510). If the specific access point has the highest priority for the channel (step 520), an assignment is made (step 530). If not the highest priority (step 520), an RSSI measurement of the neighbor access point assigned the channel is stored and the lowest RSSI becomes the determining factor (step 540).

In other embodiments, an initial channel selection made by GCA can be overridden, or influenced, by actual channel metrics. For example, microwaves can degrade even an exclusive channel, causing an updated assignment. Many other implementations are possible.

Generic Computing Device (FIG. 6)

FIG. 6 is a block diagram illustrating an exemplary computing device 600 for use in the system 100A of FIG. 1, according to one embodiment. The computing device 600 is an exemplary device that is implementable for each of the components of the system 100, including the navigation security module 115 of FIG. 1. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include the modules of the navigation security module 115. Other network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, ME, Windows NT, Windows 2000, Windows XP, Windows XP x64 Edition, Windows Vista, Windows CE, Windows Mobile, Windows 8 or Windows 10), Linux, HP-UX, UNIX, Sun OS, Solaris, Mac OS X, Alpha OS, AIX, IRIX62, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM, Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a controller for automatically selecting Wi-Fi channels for a plurality access points on a data communication network, the method comprising the steps of:

managing, with a processor of the controller, the plurality of access points utilizing a set of non-interfering channels on the data communication network, wherein a lack of interference exists between the set of non-interfering channels;

receiving scan results from each of the plurality of access points, with a network interface of the controller, the scan results comprising a list of neighboring access points from the plurality of access points relative to each access point;

responsive to a number of the plurality of access points exceeding a number of non-interfering channels, assigning, with a processor of the controller, each of the plurality of access points to a non-interfering channel with sharing of at least one of the non-interfering channels, using a GCA (Graph Coloring Algorithm) in which each color assignment corresponds to a non-interfering channel assignment in order to prevent neighboring access points from sharing a non-interfering channel; and sending, with the network interface, the channel assignments to the plurality access point.

2. The method of claim 1, further comprising:

determining through GCA that a minimum number of non-interfering channels necessary to prevent neighboring access points from sharing a non-interfering channel exceeds the number of non-interfering channels; and responsive to a number of neighboring access points for a specific access point exceeding a number of non-interfering channels, successively assigning the specific access point and one of the neighboring access points having a lowest RSSI measurement to a common to a non-interfering channel until the number of neighboring access points remaining matches the number of non-interfering channels remaining, wherein the scan results also comprise RSSI measurements for the neighboring access points relative to each access point.

3. The method of claim 1, wherein:

responsive to a number of neighboring access points for a specific access point not exceeding a number of non-interfering channels, assigning each of the neighboring access points exclusively to a non-interfering channel without overlapping neighboring access points to on a common non-interfering channel.

4. The method of claim 1, wherein a channel scan is trigged by an access point of the plurality of access points joining the data communication network resulting in a change in network topology.

5. The method of claim 1, wherein the neighbor scanning results are based on a periodic scan.

6. A non-transitory computer-readable medium, storing instructions that, when executed by a processor, perform a method in a controller automatically selecting Wi-Fi channels for a plurality access points on a data communication network, the method comprising the steps of:

managing, with a processor of the controller, a plurality of access points utilizing a set of non-interfering channels on the data communication network, wherein a lack of interference exists between the set of non-interfering channels;

receiving scan results from each of the plurality of access points, with a network interface of the controller, the scan results comprising a list of neighboring access points from the plurality of access points relative to each access point;

responsive to a number of the plurality of access points exceeding a number of non-interfering channels, assigning, with a processor of the controller, each of the plurality of access points to a non-interfering channel with sharing of at least one of the non-interfering channels, using a GCA (Graph Coloring Algorithm) in which each color assignment corresponds to a non-interfering channel assignment in order to prevent neighboring access points from sharing a non-interfering channel; and sending, with the network interface, the channel assignments to the plurality access point.

* * * * *